United States Patent [19]

Stipanovic

[11] Patent Number: 4,548,268

[45] Date of Patent: Oct. 22, 1985

[54] METHOD FOR OIL RECOVERY USING A POLYMER CONTAINING FLUID

[75] Inventor: Arthur J. Stipanovic, Wappingers Falls, N.Y.

[73] Assignee: Texaco, Inc., White Plains, N.Y.

[21] Appl. No.: 566,119

[22] Filed: Dec. 27, 1983

[51] Int. Cl.$^4$ .................... E21B 33/138; E21B 43/22
[52] U.S. Cl. .................... 166/270; 166/246; 166/274; 166/275; 166/294; 252/8.55 D; 523/130; 536/4.1
[58] Field of Search .......... 166/246, 270, 273, 274, 166/275, 294, 300; 252/8.55 D; 435/101; 523/130; 536/4.1

[56] References Cited

U.S. PATENT DOCUMENTS

| | | | |
|---|---|---|---|
| 3,208,524 | 9/1965 | Horner et al. | 166/294 |
| 3,301,848 | 1/1967 | Halleck | 536/4.1 X |
| 3,373,810 | 3/1968 | Williams | 166/246 |
| 3,779,315 | 12/1973 | Boneau | 166/294 X |
| 4,011,910 | 3/1977 | Rhudy et al. | 166/294 X |
| 4,210,204 | 7/1980 | Christopher, Jr. et al. | 166/294 X |
| 4,338,203 | 7/1982 | Hunter | 252/8.55 D |
| 4,347,146 | 8/1982 | Abdo | 252/8.55 D |
| 4,352,741 | 10/1982 | Wernau | 166/246 X |
| 4,457,372 | 7/1984 | Doster et al. | 166/246 X |
| 4,495,346 | 1/1985 | Anderson et al. | 536/4.1 X |

FOREIGN PATENT DOCUMENTS 754477 3/1967 Canada .................... 252/8.55 D

*Primary Examiner*—George A. Suchfield
*Attorney, Agent, or Firm*—Robert A. Kulason; James F. Young; James J. O'Loughlin

[57] ABSTRACT

A process for recovering hydrocarbons from a subterranean hydrocarbon bearing formation penetrated by injection well and a production well includes the steps of injecting into the formation via an injection well an aqueous drive fluid comprising water and more than about 200 parts per million of Beta-(1→6)-D-glucan having an average molecular weight of more than about $2 \times 10^4$ and comprising recurring units of the disaccharide gentiobiose:

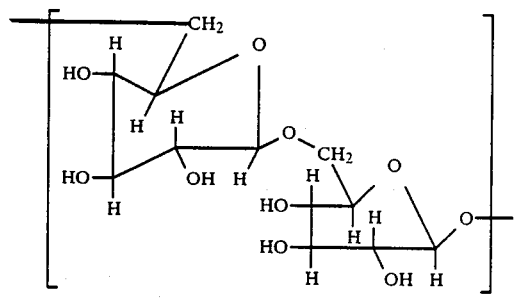

forcing said aqueous drive fluid through the formation and recovering hydrocarbons from the production well. The process also includes using a more concentrated solution of the glucan, more than about 2,000 parts per million, as a vertical conformance agent. The invention also includes a concentrate of the glucan in dimethylsulfoxide or in a 4 molar or higher concentration of aqueous urea which is diluted to form the aqueous drive fluid.

15 Claims, 6 Drawing Figures

METHOD FOR OIL RECOVERY USING A POLYMER CONTAINING FLUID

BACKGROUND OF THE INVENTION

This invention is related to the recovery of hydrocarbons by the use of a polymer containing fluid and more particularly through the use of a Beta-(1→6)-D-glucan linear homopolysaccharide otherwise known as deacetylated pustulan.

Generally, oil or hydrocarbons are recovered from subterranean formations initially employing primary recovery techniques. Once primary production is no longer economically feasible, some form of enhanced recovery is applied to these formations to abstract further quantities of oil. One of the earliest and most popular forms of enhanced oil recovery is water injection in which water or brine is injected into the hydrocarbon containing formation to force the residual hydrocarbons contained therein through the formation to a production well which is placed at a appropriate location. Since the viscosity of the hydrocarbons present in the hydrocarbon bearing formation is usually higher than the viscosity of water or other fluids injected into the formation, the quantity of hydrocarbons removed by such methods is small and further, frequently results in the bypassing of a substantial portion of the hydrocarbons by the less viscous water. This effect is referred to as viscous fingering. This situation is further aggravated by the presence of zones of high permeability at various levels in the hydrocarbon bearing formation. These so called "thief" zones also permit the escape of a substantial portion of the relatively low viscosity water or brine without any displacement of hydrocarbons.

One method of improving the efficiency of enhanced recovery techniques has been through the addition of a substance to the water or brine to increase its viscosity. U.S. Pat. Nos. 2,827,964 and 3,039,529 describe the use of high molecular weight, partially hydrolyzed polyacrylamides as thickening agents for aqueous fluids employed in enhanced oil recovery systems.

U.S. Pat. No. 3,581,824 describes the use of a heteropolysaccharide produced by bacterial fermentation of carbohydrates for this same purpose. U.S. Pat. No. 3,490,533 sets forth increasing the viscosity of the water or brine through an in situ polymerization process wherein a polymerizable monomer and a polymerization catalyst having a latent period of activity are injected into the oil bearing formation to either block areas of high permeability or form high viscosity fluids therein and to aid in the removal of the oil from the oil bearing formations.

Problems have arisen with the use of viscous fluids for enhanced oil recovery due to the expense of their formation and the large energy required for the handling and injection of the viscous fluid into wells, as compared to the injection of water or brine. The high viscosity of previous fluids required the use of higher energies for mixing and pumping. Further, the high viscosity fluids have tended to block the areas closest to the injection well thereby making it more difficult to inject the viscous fluid into the hydrocarbon bearing formation and increased the energy and operating cost of such systems. The use of viscous fluids has also been hampered by the cost and toxicity of the monomers necessary and the difficulty of causing the monomer to polymerize at the desired time and in the desired location.

SUMMARY OF THE INVENTION

This invention relates to a process for recovering hydrocarbons from a subterranean, hydrocarbon-bearing formation penetrated by an injection well and a production well which comprises:

(a) injecting into the formation via an injection well an aqueous drive fluid comprising water and more than about 200 ppm by weight of a Beta-(1→6)-D- glucan having an average molecular weight more than about $2 \times 10^4$ and comprising recurring units of the disaccharide gentiobiose:

The aqueous drive fluid is forced through the formation and hydrocarbons are recovered from the production well. The aqueous drive fluid can further comprise a hydrogen bond breaker such as urea or guanidine to vary the viscosity properties of the drive fluid. The process of the present invention can further include the steps of permitting the aqueous drive fluid to increase its viscosity to form a high viscosity gel within the high permeability portions of the subterranean formation and then injecting further quantities of an aqueous drive fluid into the injection well. The drive fluid is forced through the subterranean hydrocarbon containing formation whereby the aqueous drive fluid, unable to penetrate the gel filled "thief zones", forces quantities of hydrocarbon from the low permeability areas of the subterranean formation. The aqueous drive fluid of the present invention can be formed by dissolving the deacetylated pustulan into hot water, or diluting a concentrated solution of the deacetylated pustulan in dimethylsulfoxide (DMSO) or in an aqueous urea solution.

PREFERRED EMBODIMENTS OF THE PRESENT INVENTION

In a preferred embodiment of the present invention which is a process for recovering hydrocarbons from a subterranean hydrocarbon bearing formation, the hydrocarbon bearing formation is penetrated by an injection well and a production well. An aqueous drive fluid is injected into the formation via the injection well forcing the drive fluid through the formation and recovering hydrocarbons from the production well. The preferred aqueous drive fluid contains more than about 200 parts per million by weight of a Beta-(1→6)-D-glucan, which has an average molecular weight more than about $2 \times 10^4$ and comprising recurring units of the disaccharide gentiobiose:

The preferred glucan is a deacetylated form of native pustulan which is extracted from certain species of lichens such as *Umbilicaria papullosa* or *Umbilicaria pustulata*. The native pustulan isolated from the lichen contains a random distribution of acetate groups attached to the oxygen at the three position of approximately one of every ten glucose monomers. For use in the present invention, the native pustulan is deacetylated such as by hydrolysis in a dilute aqueous base. It is of course possible to synthesize the deacetylated pustulan through methods such as organic synthesis or through various biological routes using glucose or gentiobiose as starting materials.

The deacetylated pustulan preferably has a molecular weight between about $2 \times 10^4$ and $3 \times 10^6$, and most preferably between about $6 \times 10^4$ and $1 \times 10^5$. It has been found that deacetylated pustulan polymers outside the preferred weight range are not as effective in increasing the viscosity of the drive solution as are the polymers within the preferred molecular weight range.

It is desirable to use the deacetylated form of pustulan, since the native form containing the random acetate groups does not demonstrate the viscosity enhancing properties of the deacetylated form. This is apparent from FIG. 1 wherein the viscosity of an aqueous solution containing about 1000 parts per million of the native pustulan is compared to a similar solution of deacetylated pustulan. From FIG. 1 it can be seen that the aqueous solution of the native acetylated pustulan has a low viscosity which does not increase with time. However, the aqueous solution of the deacetylated form does display a rapid increase in viscosity over a period of days.

Figure 2:
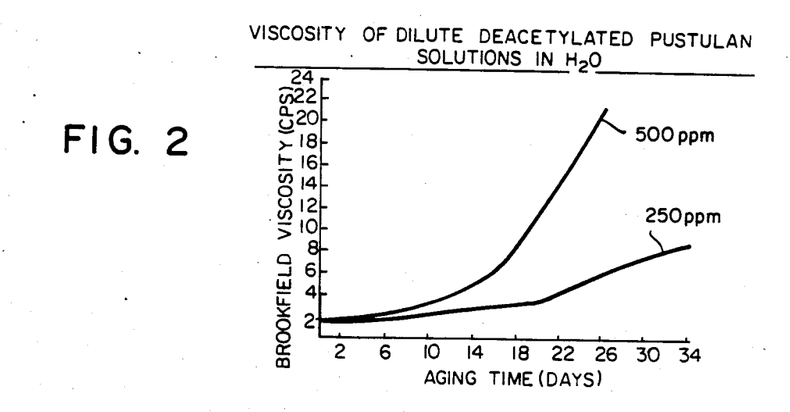
FIG. 2 represents the effect on viscosity of dilute deacetylated pustulan solutions described in Example VII.
Figure 3:
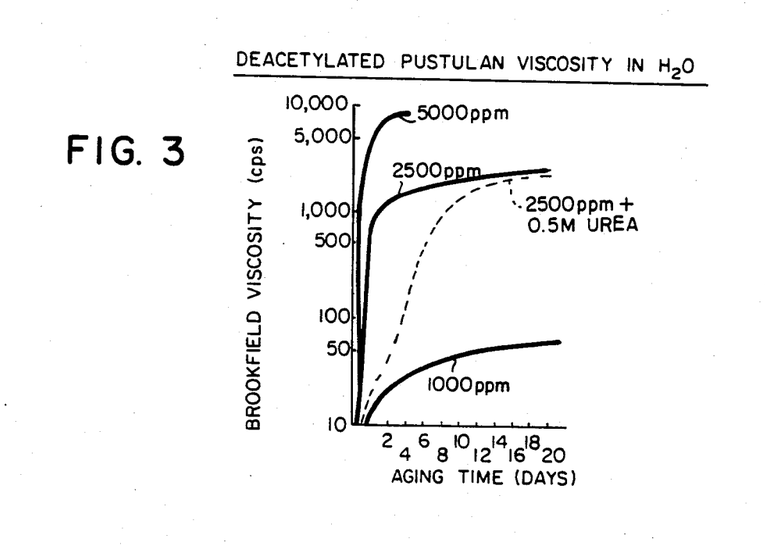
FIG. 3 represents the viscosity effect of deacetylated pustulan in aqueous solutions described in Examples VIII, IX and X.

The quantity of the deacetylated pustulan useful in the aqueous drive fluid depends upon the desired viscosity of the aqueous drive fluid. Generally, the quantity of the deacetylated pustulan used in the process of the present invention can vary from less than about 200 parts per million to much more than about 5% by weight and up to its limit of solubility. At lower concentration levels of deacetylated pustulan such as from about 200 to 2000 ppm, the aqueous drive fluid displays a modest increase in viscosity sufficient for enhanced oil recovery, this is shown in FIGS. 2 and 3. At higher concentrations, such as from about 2000 to 4000 ppm, preferably at about 2,500 parts per million or so, a weak gel is formed. At even higher concentrations, from about 4000 ppm to saturation a rigid gel is formed. FIG. 3 shows that a solution of about 5,000 parts per million forms a rigid gel. The quantity of the deacetylated pustulan necessary to form a useful aqueous drive fluid of sufficient viscosity is very small. Further, the viscosity of the drive fluid does not increase immediately but increases during a matter of hours or days depending upon the quantity of deacetylated pustulan dissolved into the aqueous drive fluid.

It has also been discovered that the addition of urea, a hydrogen bond breaker at a sufficiently high concentration, generally about four molar or higher, will completely suppress the thickening of a aqueous solution containing the deacetylated pustulan. This is apparent from FIG. 1 wherein the aqueous drive fluid containing the four molar urea shows no increase in viscosity over eight days. This permits the shipment of concentrated solutions of pustulan containing urea to the injection well site for subsequent dilution at that point, since a lower concentration of the urea, such as from about 0.1 to about 1 molar, acts to retard the increase in viscosity of a given concentration of the deacetylated pustulan (see FIGS. 1 and 3), but does not completely suppress it.

Figure 4:
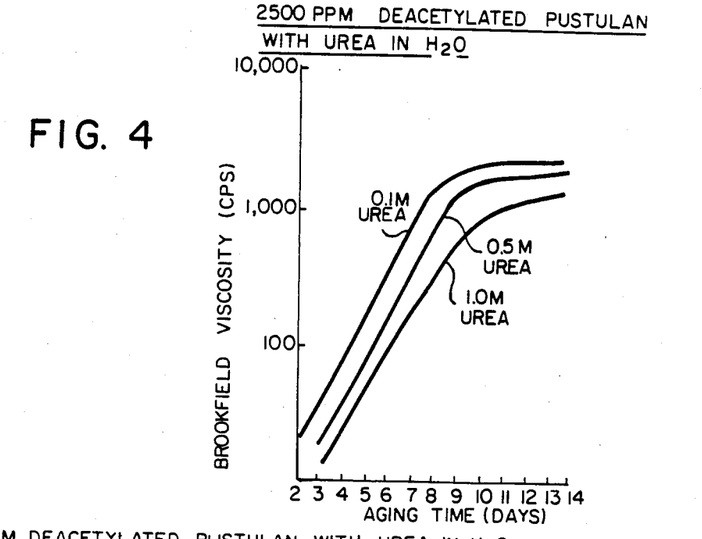
FIG. 4 illustrates the effects of deacetylated pustulan-urea mixtures in water described in Examples XI, XII and XIII.
Figure 5:
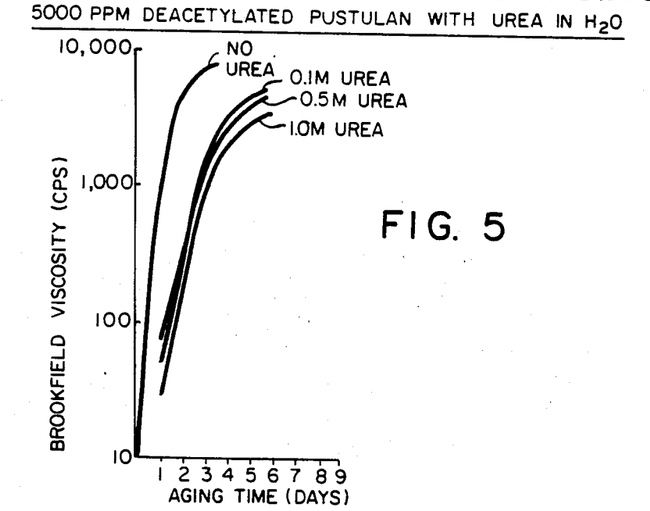
FIG. 5 illustrates the effect of 5000 ppm of deacetylated pustulan-urea mixtures in water described in Examples XIV through XVII.

The effects of different concentrations of urea on two aqueous drive fluids containing about 2,500 and 5,000 parts per million of the deacetylated pustulan is set forth in FIGS. 4 and 5, respectively. It can be seen that the addition of urea reduces the viscosity of the aqueous drive fluid during the initial aging period, as measured in days, but that eventually the viscosity does increase. The use of urea or possibly other hydrogen bond breakers, such as guanadine is useful since the increase in viscosity can be delayed permitting the fluid to be prepared in advance and further to be pumped into a desired subterranean location in a low viscosity state and then permitted to increase in viscosity to form a thicker solution or a more rigid gel.

In the formation of the aqueous drive fluid, the deacetylated pustulan can be dissolved in hot water, generally between about 80° and 95° C., under low shear conditions. Other biopolymers such as xanthan gum must be dissolved under high shear conditions. Further the deacetylated pustulan completely dissolves into the hot water without the formation of microgels such as formed by other thickening agents which then require a subsequent filtration or other processes to remove the insoluble microgels from the aqueous drive fluid. The initial solution which is formed has a viscosity similar to that of the water used, however upon standing, generally for several days, the aqueous drive fluid will develop a viscosity dependent upon the concentration of the deacetylated pustulan in the solution. As previously set forth, the use of a hydrogen bond breaker such as urea will delay the increase in viscosity of the drive fluid or the formation of the gel and will reduce the ultimate viscosity of the gel formed. Even though the aqueous drive fluid can be aged to increase its viscosity prior to injection into the hydrocarbon bearing formation, it is generally preferable to pump the aqueous drive fluid though the injection well prior to the formation of a significant viscosity.

The aqueous drive fluid can also be formed by diluting a concentrated solution of the deacetylated pustulan made by dissolving up to about 30% by weight, more preferably between about 10 and 20% by weight, of the deacetylated pustulan in dimethylsulfoxide (DMSO). As can be seen from FIG. 1, a solution of deacetylated pustulan in DMSO shows no increase in viscosity on aging for eight days. This permits a solution of deacetylated pustulan to be made at a site remote from the injection well and then shipped to the injection well area where it can be diluted to a desired concentration. The resulting diluted solution produces a desired viscosity on aging. Such a process eliminates the need to dissolve the deacetylated pustulan at the injection well site. The dilutent used can be water, an aqueous solution comprising from about 2,000 to 150,000 ppm of an inorganic salt, or an aqueous solution comprising a surfactant, preferably from about 0.001 to 10% by weight of a conventional surfactant. Other conventional aqueous drive fluids such as those comprising carbon dioxide and/or natural gas at a pressure of about 300 to 3,000 psig, or an aqueous solution comprising from about 0.005 to 0.3 weight percent of an alkaline agent including sodium hydroxide, sodium orthosilicates and potassium hydroxide may also be useful dilutents.

A low viscosity fluid requires less energy to mix, pump and inject into the hydrocarbon bearing formation. Previously used materials which increased the viscosity of the aqueous drive fluid upon mixing, required the consumption of larger quantities of energy to mix, pump and inject the viscous fluid into the hydrocarbon bearing formation. It is also generally preferred to inject a low viscosity drive fluid in order to prevent the area immediately surrounding the injection well from becoming blocked by high viscosity materials making it more difficult to inject further quantities of the drive fluid through the injection well and through the nearby areas of the hydrocarbon bearing formation.

In a preferred method of the present invention, the low viscosity aqueous drive fluid is injected into the hydrocarbon bearing formation. As the drive fluid proceeds through the formation, the viscosity of the drive fluid increases and achieves a desired level as it approaches the hydrocarbon bearing portions of the formation. Thus, the drive fluid is in a low viscosity state when penetrating areas not containing hydrocarbons thereby permitting the use of low energy pumping. The viscosity increases to the desired level as the drive fluid approaches the hydrocarbon bearing portions of the formation. At the small concentration, about 200 to 2,000 ppm, of deacetylated pustulan which is preferred, the aqueous drive fluid has a viscosity of about 20 to 100 cps or more which is effective to drive hydrocarbons from the hydrocarbon bearing formation towards a producing well through a piston-like displacement mechanism. This is because the viscosity of the aqueous drive fluid is more than that of the hydrocarbon in the formation which generally has a viscosity of between about 2 and 10 cps.

Figure 1:
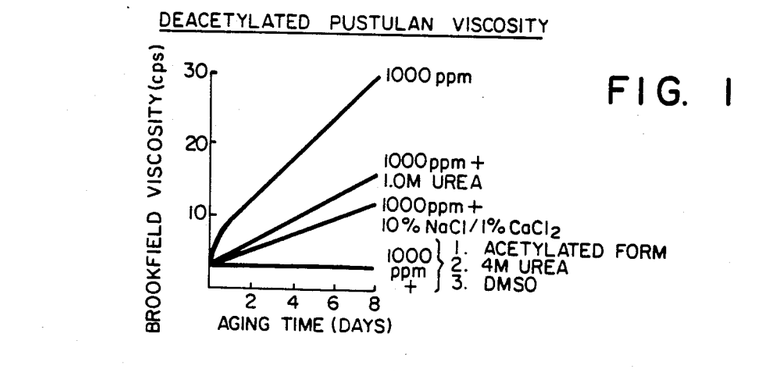
FIG. 1 represents the effect on viscosity over time from the use of deacetylated pustulan in the mixtures described in Examples I through VI.

In another preferred embodiment of the present invention, the aqueous drive fluid comprises brine. A typical oil field brine comprises about 10% by weight sodium chloride and about 1% by weight calcium chloride. It has been found that the deacetylated pustulan can be dissolved into the typical brine and will form an aqueous drive fluid of a useful viscosity. FIG. 1 shows that an aqueous drive fluid comprising brine and 1,000 parts per million of the deacetylated pustulan has a useful viscosity which is lower than that of a drive fluid without the salts. However, both drive fluids achieve a desired viscosity thus permitting the use of both.

Figure 6:
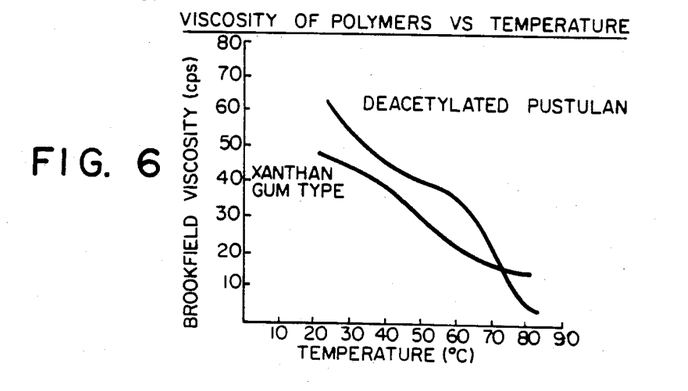
FIG. 6 illustrates the effect of temperature on deacetylated pustulan and xanthan gum described in Example XVIII.

Generally, the aqueous drive fluid containing the deacetylated pustulan will be satisfactory at temperatures up to about 70° and 80° C. Below the 70° to 80° C. range, the aqueous drive fluid will have a useful viscosity and thus can be used in subterranean formations having an elevated temperature. The temperature sensitivity of a 1,000 ppm solution of deacetylated pustulan which had been aged at room temperature is shown in FIG. 6 where it can be seen that viscosity of an aqueous solution of the deacetylated pustulan is higher at most temperatures than a 1,000 ppm aqueous solution of a previously used thickening agent based upon xanthan gum.

The aqueous drive fluid can optionally include other materials well known in the art. For example, the aqueous drive fluid can further comprise from about 2,000 to about 150,000 parts per million of an inorganic salt, or a surfactant, preferably from about 0.001 to about 10% by weight of a surfactant well known in the art. Other materials conventionally used in aqueous drive fluids such as from about 0.005 to 0.3 weight percent of an alkaline agent selected the group consisting of sodium hydroxide, potassium hydroxide and sodium orthosilicates or various gases such as carbon dioxide and natural gas which are preferably present at a pressure of from about 300 to about 3,000 psig may also be useful in the process of the present invention.

Adding the deacetylated pustulan to a surfactant containing drive solution is another embodiment of the invention. The increase in viscosity of the aqueous surfactant drive solution will improve its ability to contact hydrocarbons in the hydrocarbon bearing zones of the formation without fingering through or by-passing the more viscous areas of the formation which contain the substantial portion of the hydrocarbons. Alternatively, the injection of the surfactant containing aqueous drive solution can be immediately followed by injection of the deacetylated pustulan containing drive fluid such a combination can more effectively sweep the surfactant through the hydrocarbon bearing formation causing further quantities of hydrocarbon to be removed from the formation.

In another embodiment of the present invention, the aqueous drive fluid is used for vertical conformance. In vertical conformance, the aqueous drive fluid is injected into a hydrocarbon bearing formation penetrated by an injection well and a production well. The aqueous drive fluid used for vertical conformance can be injected into either the injection well or production well or injected through both. For vertical conformance, the aqueous drive fluid preferably contains more than about 2,000 parts per million and most preferably more than about 2,500 parts per million or more of the deacetylated pustulan. Amounts of from about 2,000 ppm to 5% by weight of the deacetylated pustulan can be used for vertical conformance, with from about 2,500 to 10,000 ppm being preferred. The aqueous drive fluid initially has a viscosity similar to that of water and is readily pumped into areas of high permeability. Generally, subterranean hydrocarbon bearing formations have areas of low permeability that contain hydrocarbons, and areas of higher permeability where the formation is particularly porous. Previously used drive fluids would generally be channelled into the areas of high porosity and permeability, thus reducing their efficiency as hydrocarbon removal agents. In the preferred process of the present invention, the aqueous drive fluid enters the areas of high permeability, the viscosity of the fluid increases and forms a gel. A gel will form when the aqueous drive fluid contains about 2,000 parts per million or more of the deacetylated pustulan. The length of time required for a gel to form can be increased by the addition of a hydrogen bond breaker such as urea. Further, the gel will form even under elevated temperature conditions, such as over 50° C., and to some degree up to between about 70° and 80° C.

After the aqueous drive fluid has been permitted to gel within the area of high permeability, a second drive fluid, either one containing a smaller concentration of the deacetylated pustulan or one of the other well known drive fluids can be injected into the formation via the injection well. Useful drive fluids include water, gases, liquified gases, aqueous solutions containing various polymers, aqueous solutions containing gases, such as carbon dioxide and natural gas, or aqueous solutions of various salts. This second drive fluid will then be able to enter only the areas of lower permeability which contain the hydrocarbon, since the previous areas of high permeability are now sealed with a gel whose permeability is much lower than that of the hydrocarbon bearing formation. The second drive fluid can then force the hydrocarbon from the hydrocarbon bearing formation towards the production well and eventual recovery.

Prior to practicing the process of this invention, it is sometimes desirable to increase the porosity of the hydrocarbon bearing formation through various processes well known in the art, such as hydraulic fracturing. Hydraulic fracturing which establishes a communication path between the injection well and the production well can be accomplished by forcing a liquid such as oil, water or another suitable liquid into the formation at pressures which are sufficient to fracture the formation and open up channels therein. Subsequently propping agents may be injected into the fractures to prevent healing and maintain the fluid flow properties of the fractured subterranean formation. Gravel, metal shot, glass beads, sand and similar materials are generally employed as propping agents.

The following examples are set forth to illustrate the present invention and are not meant to limit the invention in any way. All percentages and parts per million set forth herein are by weight, unless otherwise stated.

EXAMPLE I

A sample of native pustulan was obtained from a commercial source. This pustulan had been extracted by conventional methods from the lichen *Umbilicaria papullosa*. The native pustulan was conventionally deacetylated by saponification. The saponification was carried out by dissolving the native pustulan in a 1% aqueous sodium hydroxide solution at about 90° C. The solution was allowed to stand over night at a temperature between about 50° and 60° C. Following neutralization with hydrochloric acid, the solution was filtered and the resulting deacetylated pustulan was purified by precipitation into a mixture of methanol and isopropanol.

An aqueous solution of the deacetylated pustulan was made by dispersing about 0.1 gram of the deacetylated pustulan in about 100 milliliters of water at room temperature. The water was then heated to about 90°–95° C. The solution contained about 1000 parts per million of the deacetylated pustulan. The solution was allowed to age for about eight days during which time the viscosity of the resulting solution was measured at about one day intervals. The viscosity was measured with a Brookfield LVT viscometer with UL adapter operating at about 6 revolutions per minute and at a temperature of about 25° C. The increase in viscosity of the solution with time is shown in FIG. 1.

EXAMPLE II

A solution similar to that of Example I was formed which contained in addition to the 1,000 parts per million of the deacetylated pustulan about one molar urea. The solution was allowed to age for eight days at room temperature during which time the viscosity was periodically measured as before. The increase in viscosity of this solution over the eight day period is also shown in FIG. 1. It can be seen that the urea reduces the rate at which the viscosity of the solution increases with time.

EXAMPLE III

An aqueous solution of the deacetylated pustulan was made as in Example I which contained about 1,000 parts per million of the deacetylated pustulan and also contained about 10% by weight of sodium chloride and about 1% by weight of calcium chloride. The solution was allowed to age for eight days and its viscosity was periodically measured. The results are set forth in FIG. 1. From FIG. 1 it can be seen that the increase in viscosity of such a solution is less than that of the solution of the deacetylated pustulan in pure water but still displays a useful viscosity after aging. The salts in the solution are similar to those of the brine found in many hydrocarbon bearing subterranean formations and is similar to the brine solution used in many enhanced oil recovery operations.

EXAMPLE IV

A 1,000 parts per million solution of the deacetylated pustulan was made as in Example I and to this was added sufficient urea to form about an about 4 molar solution. On aging, this solution did not show any increase in viscosity as can been seen from FIG. 1. This shows that the presence of a large quantity of urea can completely suppress the viscosity enhancing properties of the deacetylated pustulan.

EXAMPLE V

When the native acetylated form of pustulan was dissolved in water to form a 1,000 parts per million solution, and was allowed to age for eight days, no increase in the viscosity was observed. This is set forth in FIG. 1. The lack of viscosity increase is similar to that of the deacetylated form in an about 4 molar solution of urea.

EXAMPLE VI

A 1,000 ppm solution of deacetylated pustulan was made by dissolving sufficient deacetylated pustulan in dimethylsulfoxide (DMSO) at room temperature with some low shear agitation. The solution was allowed to age for about eight days and its viscosity was determined periodically as in Example I. The viscosity of the solution did not increase as can be seen from FIG. 1. This permits a concentrated deacetylated pustulan solution to be made up and stored until needed, without gelling or gaining viscosity. This concentrated solution can be diluted to produce a solution which has an increase in viscosity on aging.

EXAMPLE VII

Two solutions of deacetylated pustulan in water were made up as in Example I. One solution had a concentration of about 250 parts per million and the other had a concentration of about 500 parts per million of the deacetylated pustulan. The solutions were allowed to age for about 34 days and the viscosity was measured periodically as in Example 1. The viscosity measurements are set forth in FIG. 2.

From FIG. 2 it can be seen even very dilute solutions of the deacetylated pustulan, about 250 or 500 parts per million show an increase in viscosity on standing. The ability to make a viscous solution at such a low concentration would make the use of deacetylated pustulan economical as an enhanced oil recovery agent. FIG. 2 shows that a 500 parts per million concentration produces a very useful enhanced oil recovery agent or drive fluid since about 26 days after of aging the solution had a viscosity of about 20 cps, which is in excess of the viscosity of the hydrocarbons found in most hydrocarbon bearing subterranean formation. FIG. 2 also shows that the viscosity of a solution of a certain concentration of deacetylated pustulan, as a function of time, can be determined in advance permitting the production of solutions with a known viscosity at a given time.

EXAMPLE VIII

An aqueous solution of about 2,500 parts per million of deacetylated pustulan was made up as in Example I. The increase in viscosity over a period of 20 days was measured as in Example 1. The results are set forth in FIG. 3 which shows that such a concentration of deacetylated pustulan causes a very rapid increase in the viscosity of the solution forming a weak gel having a viscosity well over 2,000 cps. This viscosity should be compared with the aqueous solution having 1,000 parts per million of deacetylated pustulan also shown in FIG. 3, where the viscosity increases more slowly and levels off at about 40 or 50 cps.

EXAMPLE IX

An aqueous solution containing about 5,000 parts per million of deactylated pustulan made up as in Example I. This solution showed an even more rapid increase in viscosity which leveled off at about 10,000 cps. Such a high viscosity is characteristic of a gel. The solution having the higher concentration of deacetylated pustulan can be used as a vertical conformance material in that when this material is pumped into a high permeability area of the hydrocarbon containing subterranean formation, it can form a gel there and thus becomes substantially impermeable to the much lower viscosity aqueous drive fluid injected into the production well.

EXAMPLE X

Also shown in FIG. 3 is the increase of viscosity of a solution having about 2,500 parts per million of deacetylated pustulan and about 0.5 molar urea. FIG. 3 shows that the addition of about 0.5 molar of urea to the deacetylated pustulan containing solution slows the increase of viscosity with time. This permits control over the length of time required to increase the viscosity of the drive fluid.

EXAMPLES XI–XIII

Three solutions, each containing about 2,500 parts per million of the deacetylated pustulan, and about 0.1, 0.5 and 1.0 molar urea, respectively, were made as in Example I. The increase in viscosity over a period of days of the solutions is set forth in FIG. 4. It can be seen that increasing the quantity of urea, increases the length of time necessary to achieve a given viscosity. This shows that the viscosity, at a given time, of the deacetylated pustulan containing drive fluid can be varied by the addition of urea to the solution.

EXAMPLES XIV–XVII

Four aqueous solutions containing about 5,000 parts per million of deacetylated pustulan were made as in Example I. The solutions contained about 0, 0.1, 0.5 and 1.0 molar of urea, respectively. The increase in viscosity of the solutions over a period of days was measured as in Example I. The results are set forth in FIG. 5. Here again it can seen that at high concentrations of deacetylated pustulan, a gel is formed. The addition of small quantities of urea slows the formation of the gel. This can be used to produce an aqueous drive fluid whose ultimate viscosity and the time necessary to form a given viscosity can be delayed and altered by the addition of urea.

EXAMPLE XVIII

A pustulan solution containing about 1,000 parts per million of deacetylated pustulan was made as in Example I and aged to increase its viscosity. The solution was heated and the viscosity measured at various temperatures. From the results set forth in FIG. 6, it can be seen that the viscosity of the solution decreases with increasing temperature, but that the viscosity is relatively stable until about its melting point, where the viscosity drops close to that of water. In FIG. 6, the deacetylated pustulan solution is compared to a aqueous drive fluid containing a viscosity increasing agent for enhanced oil recovery based on xanthan gum which is also a biologically derived thickening agent. FIG. 6 shows that the deacetylated pustulan containing solution has a higher viscosity over a wider temperature range than a comparable biologically produced gelling agent here xanthan gum. This permits the deacetylated pustulan containing solution to be used in applications wherein temperatures are higher.

EXAMPLE XIX

In an oil recovery process, it is important to determine the ability to inject a polymer containing aqueous drive fluid into a subterranean hydrocarbon bearing formation through an injection well without excessive pressure buildup due to pore plugging. Drive fluids formed from many polymers contain microgels, further, polymers which are obtained from biological sources, such as xantham gum preparations, contain in addition to microgels, residual dead bacterial cell bodies. Such materials often give rise to poor injectability due to the plugging of the area near the well bore with these microgels and residual bacterial cell bodies.

A simple laboratory test can be used to assess the potential injectivity of a polymer solution. In this test, solutions under constant pressure are passed through a commercially available polymer membrane (47 millimeter diameter) having a controlled pore size. Preferred pore sizes range from about 1.0 to about 3.0 microns. The time necessary to accumulate a given volume of filtrate from the membrane is recorded and can be used to determine the filter factor calculated according to the following formula:

$$\text{Filter factor} = \frac{t(300 \text{ milliliters}) - t(200 \text{ milliliters})}{t(200 \text{ milliliters}) - t(100 \text{ milliliters})}$$

wherein t represents the flow time through the membrane for the volume of fluid indicated within the parenthesis. Plugging of the pores will result in a longer flow time causing the filter factor to be above five. Solutions which do not plug the filter will have small filter factor, generally less than about five, preferably around 2. Samples for which 300 milliliters of filtrate cannot be collected after about 600 seconds are considered unacceptable since they indicate a strong potential for plugging the subterranean formations.

A 500 parts per million solution of deacetylated pustulan was prepared. The solution without aging was forced through a porous polymer membrane having a pore size of about 1.2 microns at a pressure of about 20 psi at room temperature. The filter factor was found to be about 1.6. When a similar unaged solution containing about 1,000 parts per million of deacetylated pustulan was passed through a similar porous polymer membrane at the same pressure of about 20 psi at room temperature, the filter factor was about 3.7. When the same 1,000 parts per million solution was passed through a similar membrane at a pressure of about 40 psi, the filter factor rose to about 4.9. When the same solution at a pressure of about 40 psi was forced through a porous membrane having a larger pore size of about 3.0 microns, the filter factor dropped to about 3.6.

These results show the tendency of a solution of the deacetylated pustulan, at useful concentration, to plug a porous membrane is low and acceptable. These results indicate that a deacetylated pustulan solution will have a low tendency to block the hydrocarbon bearing formations near the injection well which is important for thickeners to be used in aqueous drive fluids for enhanced oil recovery.

EXAMPLE XX

In an oil field, in which the primary production has already been exhausted, an injection well is completed in the hydrocarbon-bearing formation and perforations are formed. A production well is drilled several hundred feet from the injection well and perforations are similarly made in the same hydrocarbon-bearing formation. The hydrocarbon-bearing formation at the injection well and the production well is hydraulically fractured using conventional techniques and a propping material is injected into the fracture to hold it open and prevent healing of the fracture.

An aqueous solution containing about 1000 ppm of deacetylated pustulan is injected through the injection well into the hydrocarbon-bearing formation at a rate of about one barrel per minute. At the end of several months of injection, the rate of production of oil from the production well is substantially greater than with water injection alone.

EXAMPLE XXI

In a secondary oil recovery process such as set forth in EXAMPLE XX, the aqueous drive fluid is added through the injection well and contains about 1000 ppm of the deacetylated pustulan. This drive fluid is made by diluting a concentrate containing about 10 to 20 percent by weight deacetylated pustulan dissolved in dimethylsulfoxide (DMSO).

EXAMPLE XXII

In an oil field in which the primary production has already been exhausted, in which an injection well and production well have been drilled into the hydrocarbon-bearing formation, and in which water flooding has been used but where the ratio of oil produced per barrel of water injected is very low, an aqueous solution of deacetylated pustulan at a concentration of about 2,500 ppm and containing about 0.1 mole of urea is injected into the hydrocarbon formation via the injection well at the rate of about one barrel per minute for about 2 days. Injection is stopped for about 2 days, and then a conventional drive fluid or an aqueous drive solution comprising about 1,000 ppm of deacetylated pustulan or other polymer thickener is injected into the injection well at the normal rate of about one barrel per minute for several weeks. It is found that the ratio of oil per barrel of water recovered from the production well is now much higher than that produced prior to the injection of the 2,500 ppm solution of deacetylated pustulan.

EXAMPLE XXIII

In a oil field in which the primary production has already been exhausted, in which an injection well and a production well have been drilled into the hydrocarbon-bearing formation, and in which water flooding has been used but where the ratio of oil produced per barrel of water injected is very low, an aqueous solution of deacetylated pustulan at a concentration of about 2500 ppm and containing about 0.1 mole of urea is injected into the hydrocarbon formation via the producing well at the rate of about one barrel per minute for about 2 days. Injection is stopped for about 2 days, and then a conventional drive fluid or an aqueous drive solution comprising about 1000 ppm of deacetylated pustulan or other polymer thickener is injected into the injection well at the normal rate of about one barrel per minute for several weeks. It is found that the ratio of oil per barrel of water recovered from the production well is now much higher than that produced prior to the injection of the 2,500 ppm solution of deacetylated pustulan.

EXAMPLE XXIV

In an oil field in which the primary production has already been exhausted, in which an injection well and a production well have been drilled, and in which the use of a conventional drive fluid comprising a surfactant solution has become ineffective in recovering further quantities of oil, sufficient deacetylated pustulan is added to the surfactant solution to produce a concentration therein of about 1000 ppm of the deacetylated pustulan. The aqueous drive solution containing both the surfactant and the deacetylated pustulan is then injected into the hydrocarbon bearing formation via the injection well at a rate of about one barrel per minute. The production of oil is substantially greater than is achieved by the use of the surfactant alone.

EXAMPLE XXV

In an oil field in which the primary production has already been exhausted, in which an injection well and a production well have been drilled into the hydrocarbon-bearing formation and in which the use of a conventional aqueous drive fluid containing a surfactant is ineffective in increasing the production of oil from the hydrocarbon-bearing formation, the injection of the surfactant containing solution into the hydrocarbon bearing formation is followed with the injection of an aqueous drive fluid comprising about 1000 ppm of deacetylated pustulan. The injection of the aqueous surfactant solution followed by injection of the deacetylated pustulan containing drive solution produces substantially more oil than the use of the surfactant containing drive fluid alone.

EXAMPLE XXVI

In an oil field wherein hydrocarbon production has been exhausted, in which an injection well and a production well have been drilled into a hydrocarbon-bearing subterranean formation, an aqueous solution of between about 0.5 and 2% by weight of deacetylated pustulan is pumped into the subterranean formation through the injection and/or production well. The deacetylated pustulan enters the large fractures and porous areas of the subterranean formations and forms a gel therein. This gel seals the subterranean formation and prevents fluids, including ground water and drive fluids from other injection wells from entering the subterranean formation.

The above examples are set forth to illustrate the present invention to which modifications can be made by those skilled in the art without going outside the scope of the present invention which is set forth in the following claims.

What is claimed is:

1. A process for recovering hydrocarbons from a subterranean hydrocarbon bearing formation penetrated by an injection well and a production well which comprises:
   (a) injecting into the formation via said injection well an aqueous drive fluid comprising water and more than about 200 ppm of a Beta-(1→6)-D-glucan having an average molecular weight more than about $2 \times 10^4$ and comprising recurring units of the disaccharide gentiobiose:

(b) forcing said aqueous drive fluid through the formation; and
   (c) recovering hydrocarbons from said production well.

2. The process of claim 1 wherein said aqueous drive fluid further comprises a hydrogen bond breaker.

3. The process of claim 2 wherein said hydrogen bond breaker comprises urea.

4. The process of claim 1 wherein said Beta-(1→6)-D-glucan comprises from about 200 ppm to about 5% by weight of said aqueous drive fluid.

5. The process of claim 1 wherein said aqueous drive fluid further comprises and additive selective from the group consisting of from about 2,000 to 150,000 ppm of an inorganic salt, a surfactant, and carbon dioxide and/or natural gas at a pressure of about 300 to about 3,000 psig.

6. The process of claim 1 wherein said aqueous drive fluid further comprises from about 0.005 to about 0.3 weight percent of an alkaline agent selected from the group consisting of sodium hydroxide, potassium hydroxide and sodium orthosilicates.

7. The process of claim 1 wherein said Beta(1→6)-D-glucan has a molecular weight between about $2 \times 10^4$ and $1 \times 10^5$.

8. The process of claim 1 and further comprising the step of injecting into the formation via said injection well a surfactant containing aqueous drive solution prior to step (a).

9. A process for recovering hydrocarbons from a subterranean, hydrocarbon bearing formation penetrated by an injection well and a production well wherein said formation has areas of high permeability which comprises:
   (a) injecting into the formation via said injection well and/or said production well an aqueous drive fluid comprising water and more than about 2,000 ppm of a Beta-(1→6)-D-glucan having an molecular weight more than about $2 \times 10^4$ and comprising recurring units of the disaccharide gentiobiose:

wherein said aqueous drive fluid has a viscosity similar to water, (b) forcing said drive fluid through the formation into the areas of high permeability, (c) permitting said drive fluid to increase its viscosity therein (d) injecting into the formation via said injection well a second drive fluid; and (e) recovering hydrocarbons through said production well.

10. The process of claim 9 wherein said Beta-(1→6)-D-glucan is present at a concentration of from about 2,500 to about 10,000 ppm.

11. The process of claim 9 wherein said second drive fluid is forced through the hydrocarbon bearing portions of the formation and wherein said second drive fluid is prevented from penetrating the high permeability areas of the formation by the presence of said viscous Beta-(1→6)-D-glucan containing aqueous drive fluid.

12. The process of claim 9 wherein said aqueous Beta-(1-6)-D-glucan containing drive fluid further comprises a hydrogen bond breaker.

13. The process of claim 12 wherein said hydrogen bond breaker comprises urea.

14. The process of claim 9 wherein said second drive fluid comprises water and more than about 200 ppm of said Beta (1-6)-D-glucan of claim 9.

15. The process of claim 14 wherein said second drive fluid further comprises an additive selected from the group consisting of a surfactant, about 2,000 to about 150,000 ppm of an inorganic salt, and carbon dioxide and/or natural gas at a pressure of about 300 to 3,000 psig.

* * * * *